May 31, 1932.  H. F. KELLOGG  1,860,715
SCREW
Filed May 22, 1930
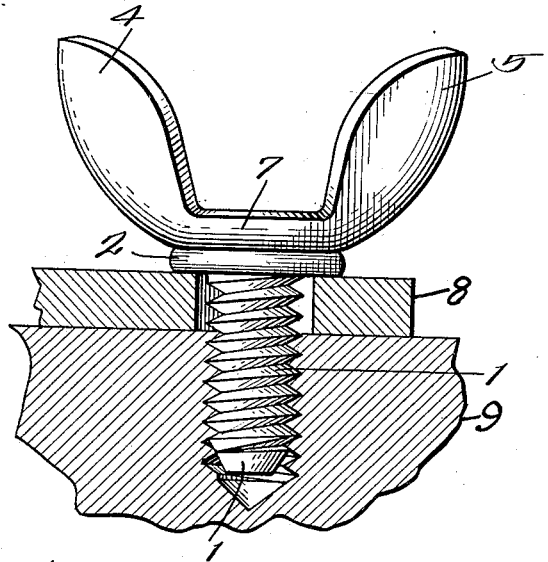
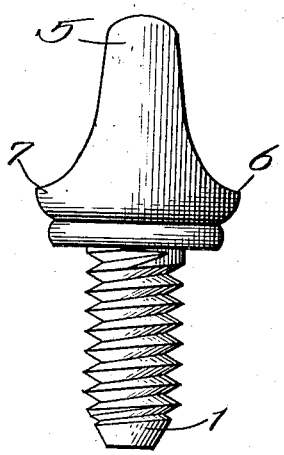
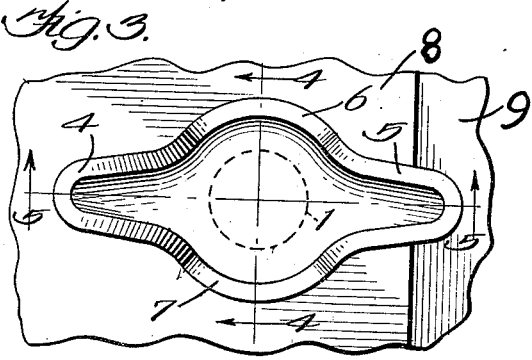
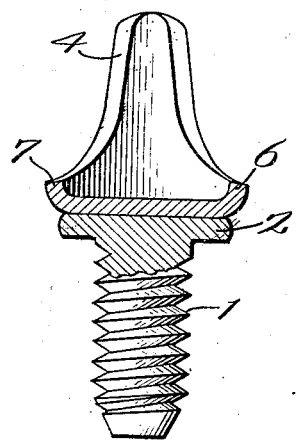
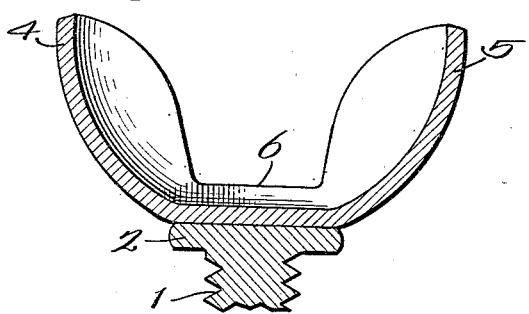
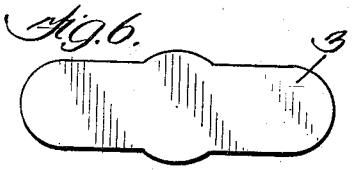
Inventor:
Harry F. Kellogg
By G. L. Cragg Atty.

Patented May 31, 1932

1,860,715

UNITED STATES PATENT OFFICE

HARRY F. KELLOGG, OF CHICAGO, ILLINOIS

SCREW

Application filed May 22, 1930. Serial No. 454,633.

My invention relates to screws which are provided with gripping heads whereby they may be manually turned and more particularly to those screws in which the heads are separately formed and afterwards applied to the shanks of the screws.

My invention has for its general object the formation of an applied screw head which is conformable to the thumb and finger of a user and is of such shape as to permit it to be made of light material without impairing its strength.

In accordance with one characteristic of the invention the screw head is made of sheet metal and has its mid-portion ribbed and applied to one end of the shank. In accordance with another characteristic of the invention the head is of cup formation, the bottom of the cup being applied to the shank and opposite the sides of the cup being shaped to constitute thumb and finger holds.

In the preferred embodiment of the invention the end portions of the head are bent to project from the shank and folded along the median line of the head to constitute thumb and finger engaging wings. The sides of the mid-portion of the head are also desirably bent away from the shank into strengthening ribs that merge with the wings and constitute, with the wings, a cup formation whose bottom is applied to the shank. The end portion of the shank to which the head is applied is desirably formed into a flange which affords a much increased shank portion for the attachment of the head thereto and to make it unnecessary to apply the head to the shank with accuracy. The attachment is desirably effected by passing welding heat producing electric current through the abutting faces of the shank and head. The flange upon the shank permits the head to be welded to the shank laterally of the threaded portion of the shank to strengthen the leverage between the head and shank. The use of sheet metal for the construction of the screw head enables the welding heat to be concentrated at the engaging faces of the head and shank.

The invention will be more fully explained in connection with the accompanying drawings in which Fig. 1 is a view in elevation of a screw constructed in accordance with the preferred embodiment of the invention, this figure also illustrating, in section, a support and an object held in assembly with the support by means of the screw; Fig. 2 is another elevation of the screw taken at right angles to the direction in which Fig. 1 is taken; Fig. 3 is a plan view of the parts shown in Fig. 1; Fig. 4 is a sectional view on line 4—4 of Fig. 3 with a portion of the shank shown in full elevation; Fig. 5 is a sectional view on line 5—5 of Fig. 3 with a portion of the shank broken away; and Fig. 6 is a plan view of a sheet metal blank from which the preferred form of screw head may be shaped.

The screw illustrated is inclusive of a threaded shank 1 having one end portion shaped into a flange 2 that extends laterally of the shank throughout its circumference.

The metal from which the screw shank is made is usually or preferably iron which is also true of the head that is to be applied to the shank. This screw head is desirably made of a piece of sheet metal initially in the form of a flat plate 3 as illustrated in Fig. 6. The head formed from such blank is desirably given its final shape before it is applied to the screw shank. The mid-portion of the head is suitably applied, as by welding, to the flange end 2 of the shank 1. The end portions of the head are bent to project from the shank and are folded along the median line of the head to constitute thumb and finger engaging wings 4 and 5. The sides 6 and 7 of the mid-portion of the head are bent away from the shank into strengthening ribs that merge with the base ends of the wings to constitute, with the wings, a cup formation. The wings are desirably of U-shape, in plan, so that the cup cavity, although as here illustrated mainly circular, is diametrically extended into the spaces embraced by the wings. The ribs 6 and 7 are diametrically opposite and extend sufficiently laterally of the shank beyond the wings to afford resting places for the thumb and finger of the user and to position the same in comfortable engagement with the wings.

The iron from which the screw head is made is sufficiently thick to produce a strong screw head and is sufficiently thin to be readily raised to welding heat by means of suitable electric current lending itself readily to spot welding. The flange is also of approximately the same thickness as the metal of the head so that it also may readily be raised to welding heat. The welding current is applied when the head is placed in the position it is to occupy upon the shank and is quickly effective to secure the merger of the head and shank flange. It will be observed that the shank flange 2, and not the screw head, maintains the clamping pressure that secures the object 8 against the support 9 when the screw is used as illustrated in Figs. 1 and 3. This may be of advantage in some instances.

Changes may be made without departing from the invention.

Having thus described my invention, I claim:

In a screw adapted to exert clamping pressure, the combination of a threaded shank; a plate-like end portion on said shank forming a flange extending laterally of the shank throughout its circumference; a relatively thin sheet metal head folded to form a central cupped portion having an imperforate flat bottom and thumb and finger wings integral with said bottom, said plate-like portion and said bottom being of substantially equal area and having opposed faces contacting throughout a surface of equivalent area; and means for intimately and rigidly uniting said opposed faces substantially throughout their area of contact.

In witness whereof, I hereunto subscribe my name.

HARRY F. KELLOGG.